(12) United States Patent
Apostolides et al.

(10) Patent No.: US 12,467,550 B1
(45) Date of Patent: Nov. 11, 2025

(54) DEVICES, SYSTEMS, AND METHODS FOR RELIEVING AND REGULATING PRESSURE DURING THE PERFORMANCE OF A FLUID SERVICE ON A MACHINE

(71) Applicant: RPM INDUSTRIES, LLC, Washington, PA (US)

(72) Inventors: John K. Apostolides, Wexford, PA (US); William E. Ryckman, Coal Center, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 0 days.

(21) Appl. No.: 18/872,412

(22) PCT Filed: May 8, 2024

(86) PCT No.: PCT/US2024/028354
§ 371 (c)(1),
(2) Date: Dec. 6, 2024

(51) Int. Cl.
*F16K 17/06* (2006.01)
*F16K 15/06* (2006.01)

(52) U.S. Cl.
CPC ............ *F16K 17/06* (2013.01); *F16K 15/063* (2013.01); *F16K 2200/304* (2021.08)

(58) Field of Classification Search
CPC ...... F16K 11/044; F16K 17/20; F16K 17/025; F16K 2200/304; F16K 17/06
See application file for complete search history.

(56) References Cited

U.S. PATENT DOCUMENTS

| 4,880,030 A * | 11/1989 | Terry ................... F16K 17/30 |
| | | 137/460 |
| 5,613,518 A | 3/1997 | Rakiesku |
| 2003/0029504 A1 | 2/2003 | Neugebauer et al. |
| 2003/0051756 A1 | 3/2003 | Hope et al. |
| 2015/0000748 A1 | 1/2015 | Shelcoviz et al. |
| 2021/0381406 A1 | 12/2021 | Apostolides |
| 2023/0400107 A1 * | 12/2023 | Bouygues ......... F16K 31/52416 |

OTHER PUBLICATIONS

International Search Report and Written Opinion of the International Searching Authority for International Application No. PCT/US2024/028354 issued Oct. 8, 2024.

* cited by examiner

*Primary Examiner* — P. Macade Nichols
(74) *Attorney, Agent, or Firm* — K&L Gates LLP

(57) ABSTRACT

A valve assembly configured to perform a fluid service on a machine is disclosed herein. The valve assembly can include an inlet/outlet port fluidically coupling a fluid component to an internal cavity defined by the valve assembly, a filter port fluidically coupling the internal cavity to a filter of the machine, and a pressure regulating system. The pressure regulating system can include a plunger head configured to transition between an open position and a closed position, a plunger head seat, and a spring comprising a spring constant configured to bias the plunger head in the open position, wherein the spring constant is configured to be overcome in response to a predetermined pressure within the machine.

18 Claims, 10 Drawing Sheets

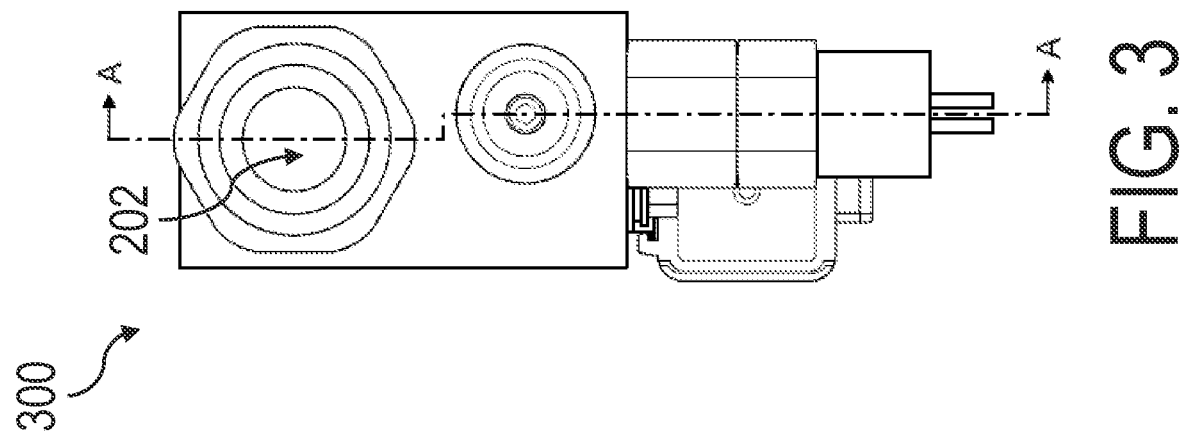

DEVICES, SYSTEMS, AND METHODS FOR RELIEVING AND REGULATING PRESSURE DURING THE PERFORMANCE OF A FLUID SERVICE ON A MACHINE

FIELD

The present disclosure is generally related to valve assemblies configured for use with fluid systems of machines and, more particularly, is directed to valve assemblies that can self-regulate and/or relieve pressure while performing a fluid service on an engine of a machine.

SUMMARY

In some aspects, the present disclosure is directed to a valve assembly configured to perform a fluid service on a machine. The valve assembly can include an inlet/outlet port fluidically coupling a fluid component to an internal cavity defined by the valve assembly, a filter port fluidically coupling the internal cavity to a filter of the machine, and a pressure regulating system including a plunger head configured to transition between an open position and a closed position, a plunger head seat, wherein the plunger head and the plunger head seat are collectively configured to define an aperture between the internal cavity and the filter port in the open position, and wherein the plunger head and the plunger head seat are collectively configured to establish a fluidic seal between the internal cavity and the filter port in the closed position, and a spring including a spring constant configured to bias the plunger head in the open position, wherein the spring constant is configured to be overcome in response to a predetermined pressure within the machine.

In other non-limiting aspects, the present disclosure is directed to another valve assembly configured to perform a fluid service on a machine. The valve assembly can include an inlet/outlet port fluidically coupling a fluid component to an internal cavity defined by the valve assembly, a machine reservoir port fluidically coupling the internal cavity to a machine reservoir of the machine, and a pressure relief system including a housing, a poppet defining an aperture, wherein the poppet is configured to transition between a closed position wherein the aperture is contained within the housing and incapable of conveying fluid from the internal cavity to the machine reservoir port, and an open position wherein the aperture protrudes beyond the housing and capable of conveying fluid from the internal cavity to the machine reservoir port, and a spring including a spring constant configured to bias the poppet in the closed position, wherein the spring constant is configured to be overcome in response to a predetermined pressure within the valve assembly.

In still other non-limiting aspects, the present disclosure is directed to a method of managing pressure within a valve assembly is disclosed. The method can include initiating, via the valve assembly, a fluid process on a machine, regulating, via a pressure regulating system, a first pressure within the machine during the fluid process, relieving, via a pressure relief system, a second pressure within the valve assembly during the fluid process, and completing the fluid process on a machine.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 3 illustrates a side view of another valve assembly, including a pressure relief system, in accordance with at least one non-limiting aspect of the present disclosure;

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
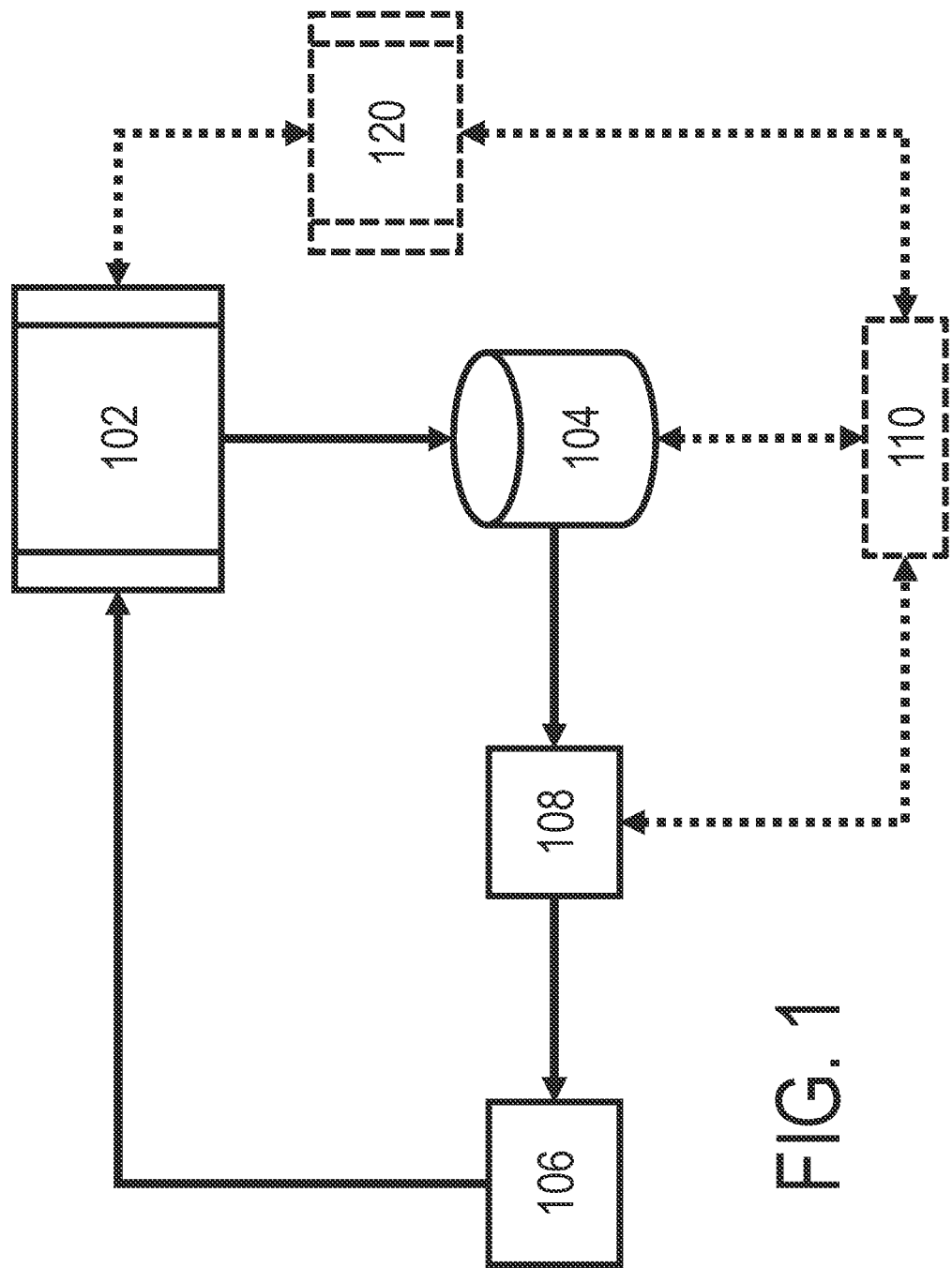
FIG. 1 illustrates a fluid system, including a valve assembly configured to regulate and/or relieve pressure during the performance of a fluid service on a machine, is depicted in accordance with at least one non-limiting aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

Before explaining various aspects of the devices, systems, and methods for establishing a fluidic connection with a gender agnostic actuator, it should be noted that the illustrative examples are not limited in application or use to the details disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof.

The term "machine" as applied herein may include any equipment suitable for use in accordance with the present techniques, methods, and systems. Examples of "machines" as applied herein can include, without limitation, lubrication systems, engines, diesel engines, large-scale diesel engines, motors, rotating equipment, generators, aircraft engines, emergency machines, emergency generators, compressors, equipment that includes a machine (e.g., such as mining equipment, construction equipment, marine equipment, aircraft, etc.), and many other machines. As described in various portions of the present disclosure, the example of an "engine" is employed for convenience of disclosure in describing various embodiments and aspects of the present invention. It can be appreciated by those skilled in the art, however, that such use of "engine" as one example of a type of machine is intended merely for convenience of disclosure and is not necessarily intended to limit the scope of the invention.

Another example of a machine is a "fluid reservoir system" which may include any reasonable combination of fluid reservoirs, fluid components such as valves, pumps, and/or other components suitable for incorporation into a fluid reservoir system.

The term "evacuation" as applied to the systems and methods disclosed herein may include evacuation of any portion of a fluid of a machine, a receptacle, a reservoir, or other like fluid-retaining system or apparatus. Similarly, the term "refill" as applied to the systems and methods disclosed herein may include refill of any portion of the fluid capacity of a machine, receptacle, reservoir, or other like fluid-retaining system or apparatus.

The term "valve system" as applied to the systems and methods disclosed herein may include any combination of valves, pipes, disconnects, adapters and other like structural components configured for performing one or more fluid refill and/or fluid evacuation processes.

Examples of valves included within a valve system may include, without limitation, single-position valves, multi-position valves (e.g., such as junction block assemblies or five-way control valves), mechanical valves, electronic valves, electro-mechanical valves, and/or other types of valves with or without electronic control for actuating the various possible open or closed positions of such valves.

Where suitable and applicable to the various embodiments of the present systems and methods discussed herein, it can be appreciated that various components, structures, elements, and other configurations may be applied or installed in a location considered external or internal to the operation of a particular machine. In applicable portions herein in which the use of pumps and/or supplemental pumps is disclosed, for example, such pumps may be positioned, installed, or operated as internal components of a machine and/or as externally positioned components that assist, or otherwise operate in conjunction with, the functions of the machine. For example, in certain embodiments a supplemental pump or other engine component may be considered "onboard" with respect to the machine.

As employed herein, the term "type" or "kind" used with regard to various fluids discussed herein is intended to distinguish different types or kinds of fluids between/among each other. For example, oil is considered one "type" of fluid, transmission fluid is considered another, different "type" of fluid, and hydraulic fluid is considered another, different "type" of fluid. It should be noted, for example, that a used amount of a "type" of fluid is not considered different with respect to a clean or fresh fluid of the same "type" (e.g., clean oil used in a fluid refill or replacement process for a machine is not considered a different "type" of fluid with respect to the used oil drained from the machine during a fluid evacuation process).

Many industrial machines and equipment have requirements for fluid exchanges. Examples of these fluid exchanges include changing the oil in motors and engines or hydraulic fluid in presses and lifting equipment. Countless other examples exist, but what is generally common to these machines or equipment is the fact that the outlet port is inconveniently located. Typically, this is the result of having to remove the fluid from a sump or drainage point that is located at the bottom of the machine to utilize gravity flow.

It shall be further appreciated that, when dealing with fluidic systems, maintaining a desired operating pressure can be critically important to the safe operation of a machine. For example, machines, such as engines (e.g., diesel engines, internal combustion engines) generally use fluids, such as oil, for lubrication and for smooth and effective operation. Aside from lubrication during operation, lubricating a machine at or before start-up can beneficially reduce the loads imposed on an engine due to the relatively high compression ratios necessary to effect combustion, thereby improving the life expectancy of a machine. For example, certain devices and/or systems—including those disclosed by U.S. Pat. No. 9,523,296, titled VALVE ASSEMBLY FOR MACHINE FLUID OPERATIONS, and issued on Dec. 20, 2016, and U.S. Pat. No. 4,502,431, titled PRE-COMBUSTION ENGINE LUBRICATION SYSTEM, and issued on Mar. 5, 1985, the disclosures of which is hereby incorporated by reference in their entireties herein—can help achieve such results. Such devices can provide supplemental pre-lubrication to an engine, permitting fluid to commence circulation prior to the activation of primary equipment or the engine itself.

However, maintaining the correct fuel pressure in any device or system connected to the engine of a machine is of utmost importance for achieving optimal engine performance, fuel efficiency, and emissions control. For example, exceeding the optimal pressure in a crankcase alone can adversely affect exhaust gas recirculation and cause leaks about oil seals and piston rings, which can reduce engine life. Accordingly, there is a need for devices, systems, and methods for regulating and relieving fluid pressure via a supplemental engine device.

Referring now to FIG. 1, a fluid system 100, including a valve assembly 106 configured to regulate and/or relieve pressure during the performance of a supplemental fluid service on a machine 102, is depicted in accordance with at least one non-limiting aspect of the present disclosure. According to the non-limiting aspect, of FIG. 1, the fluid system 100 can include a machine 102, a valve assembly 106, one or more fluid components 108, and/or a pump 104, amongst other components. The machine 102, the valve assembly 106, the one or more fluid components 108, and/or the pump 104 can be placed in fluidic communication with each other via fluidic interfaces, such as a quick disconnect connector, a cam-lock, a barbed connector, a friction fit connector, a clamped connector, and/or other connections configured for user-friendly connections. Moreover, the machine 102, for example, can be configured for commercial and/or industrial use. For example, the machine 102 of the fluid system 100 of FIG. 1 can include an engine (e.g., a diesel engine, an internal combustion engine, etc.). However, it shall be appreciated that, according to other non-limiting aspects, the fluid system 100 of FIG. 1 can include any other machine 102 that requires periodic fluid services.

It shall be appreciated that the system 100—and more specifically, the valve assembly 106 of the system 100—can enable a user to complete several fluid services on the machine 102 via a single interface. The mechanical geometry of the machine 102 can be complex and inaccessible. However, as will be described in further detail with reference to FIG. 2, the valve assembly 106 of the fluid system 100 can provide a single, accessible interface by which a user can connect the pump 104 and the one or more fluid components 108 to the machine 102, such that a variety of fluid services can be easily performed. Thus, the fluid system 100 promotes efficiency and safety by eliminating the need for the fluid component 108 and/or pump 104 to be inconveniently positioned relative to the machine 102. Additional benefits provided via the system 100 include leak mitigations, ease of measurements (e.g., dipstick readings, etc.), contamination control, and accessibility.

As previously discussed, the fluid system 100 of FIG. 1 can include a pump 104, a fluid component 108, and a valve assembly 106, which can be collectively configured to perform a variety of fluid services (e.g., fluid evacuations, fluid purges, fluid refills, etc.) on the machine 102. The fluid component 108, for example, can include at least one of a supplemental filter, a fluid reservoir, a sampling device, a flow control device (e.g., a bracket or evacuation bracket, etc.), a quick-disconnect structure or other coupling, or any other component, device, or any other system suitable for servicing the machine 102. Of course, the specific system 100 configuration of FIG. 1 is non-limiting and, according to other non-limiting aspects, functionality provided by one component of the system 100 (e.g., pump 104) can be duly provided by another (e.g., fluid component 108). For example, according to one non-limiting aspect, functionality provided by the pump 104 of FIG. 1 can be alternately provided by the fluid component 108 (e.g., a sampling device, etc.) and vice versa. According to other non-limiting aspects, the fluid component 108 of the system 100 of FIG. 1 can include a purge, evacuation, refill, and timestamp system (such as the PERT system available from RPM Industries, LLC), a fluid evacuation and refill system (such as the QuickFit system available from RPM Industries, LLC), a fluid evacuation and refill system (such as the QuickEvac system available from RPM Industries, LLC), or a multiple fluid evacuation and refill system (such as the MultiVac system available from RPM Industries, LLC), and as disclosed in U.S. Pat. Nos. 6,216,732, 6,708,710, 7,150, 286, 9,062,575 and 9,523,296, the disclosures of which are hereby incorporated by reference in their entirety herein.

Still referring to FIG. 1, according to some non-limiting aspects, the system 100 can further include an internal data module 120 that can be operatively associated with the machine 102 for receiving, storing and/or processing data related to functions performed within the fluid system 100. In addition, according to the non-limiting aspect of FIG. 1, the system 100 can further include a control module 110 operatively associated with various components of the fluid system 100. The control module 110 can include a processor for executing various commands within and directing the function of various components of the fluid system 100, including of the valve assembly 106. Additionally, or alternatively, the control module 110 can be configured to receive and process data from one or more components of the fluid system 100, including sensor 112 inputs. It shall be appreciated, therefore, that the control module 110 can be configured to monitor fluid system 100 conditions and/or parameters, including temperature, pressure, voltage, current, fluid contaminants, cycle time, and/or flow, amongst other conditions and/or parameters associated with operation of the fluid system 100.

According to some non-limiting aspects, the control module 110 of the system 100 of FIG. 1 can be configured to provide alerts or notifications related to conditions and/or functions associated with the system 100. Such indicators can be audible, haptic, visual, or audiovisual, and can be provided directly via indicators 114 integral to the control module 110 or via a peripheral 116 (e.g., a screen, a computer, a smart phone, a tablet, etc.) communicably coupled to the control module 110. It shall be further appreciated that the control module 110 can be controlled via a user interface accessed via the indicator 114 and/or peripheral 116. The control module 110 may also include one or more data storage media for storing, retrieving and/or reporting data communicated to the control module 110. Data stored within the data storage media may include a variety of data collected from the condition of the fluid system 100 including, for example and without limitation, fluid condition, particle count of contaminants, cycle time data for time to evacuate or time to refill a given reservoir, fluid receptacle or other fluid storage/retention medium.

As previously discussed, the system 100 of FIG. 1 can be configured to establish a fluidic communication between the various system components to perform a fluid service on the machine 102. For example, according to some non-limiting aspects, the machine 102 can be connected to the pump 104, the fluid component 108, and the valve assembly 106, as shown. The pump 104, for example, can include a supplemental or pre-lubrication pump and may be either integral, proximal, or remotely located relative to the machine 102. According to some non-limiting aspects, the fluid system 100 can be configured to perform a fluid evacuation procedure on the machine 102, wherein operation of the pump 104 can evacuate a fluid from the machine 102. According to other non-limiting aspects, the fluid system 100 can be used to perform a fluid purge procedure, wherein operation of the pump 104 in conjunction with a fluid component 108 (e.g., a supplemental filter) can clean a fluid in the machine 102. According to still other non-limiting aspects, the system 100 can be used to perform a fluid fill procedure, wherein operation of the pump 104 can introduce new, unused fluid from the reservoir into the machine 102. Regardless, it shall be appreciated that, upon performing a fluid service on the machine 102, the fluid component 108 can supply a pressure (either positive or negative, depending on the specific service and/or device) to the valve assembly 106, as will be described in further detail with reference to FIGS. 2A-C.

Figure 2A:
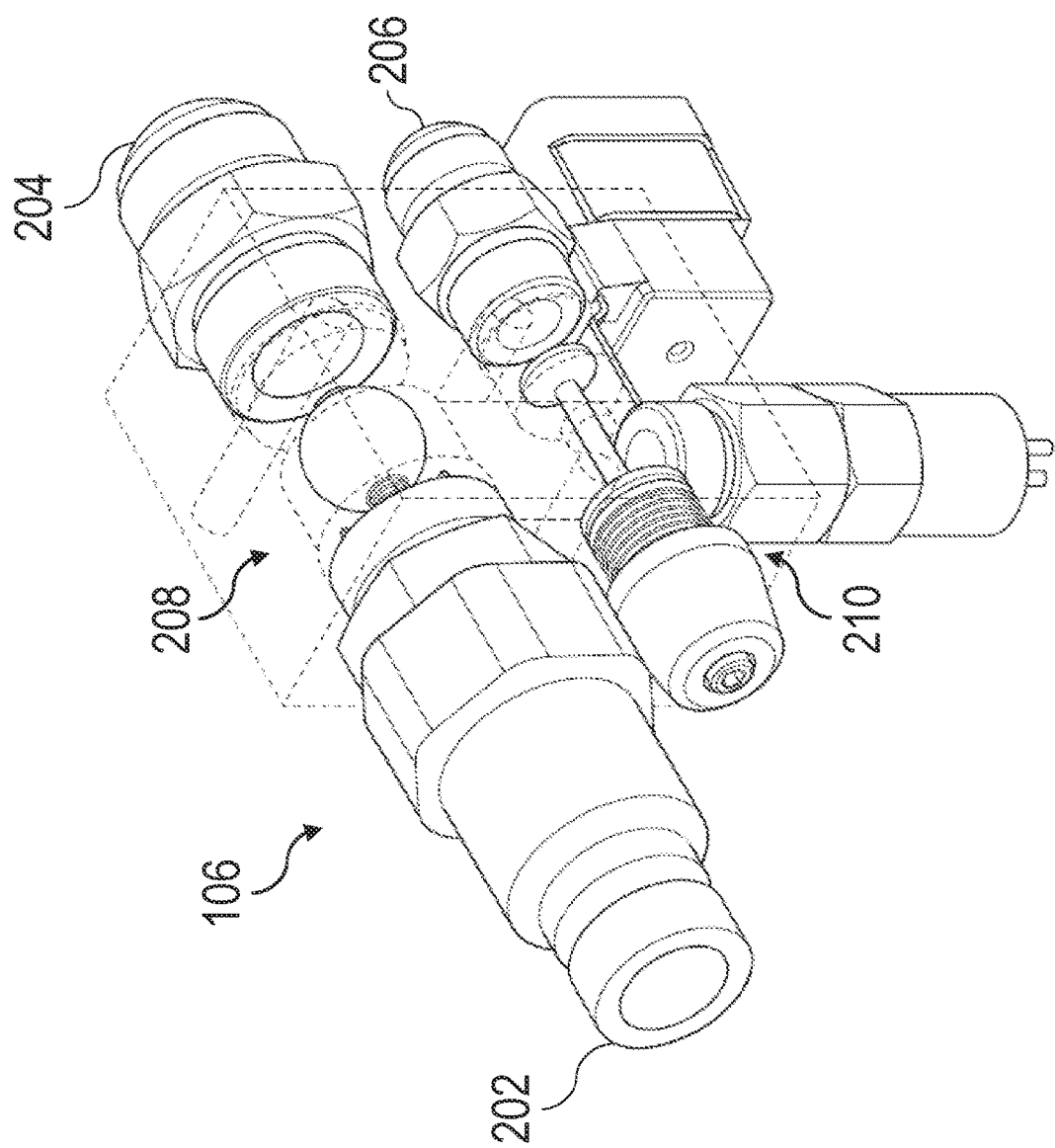
FIGS. 2A-C illustrate a perspective, side, and sectioned view of the valve assembly of the system of FIG. 1, respectively, wherein the valve assembly includes a pressure relief system and a pressure regulating system, in accordance with at least one non-limiting aspect of the present disclosure.
Figure 2C:
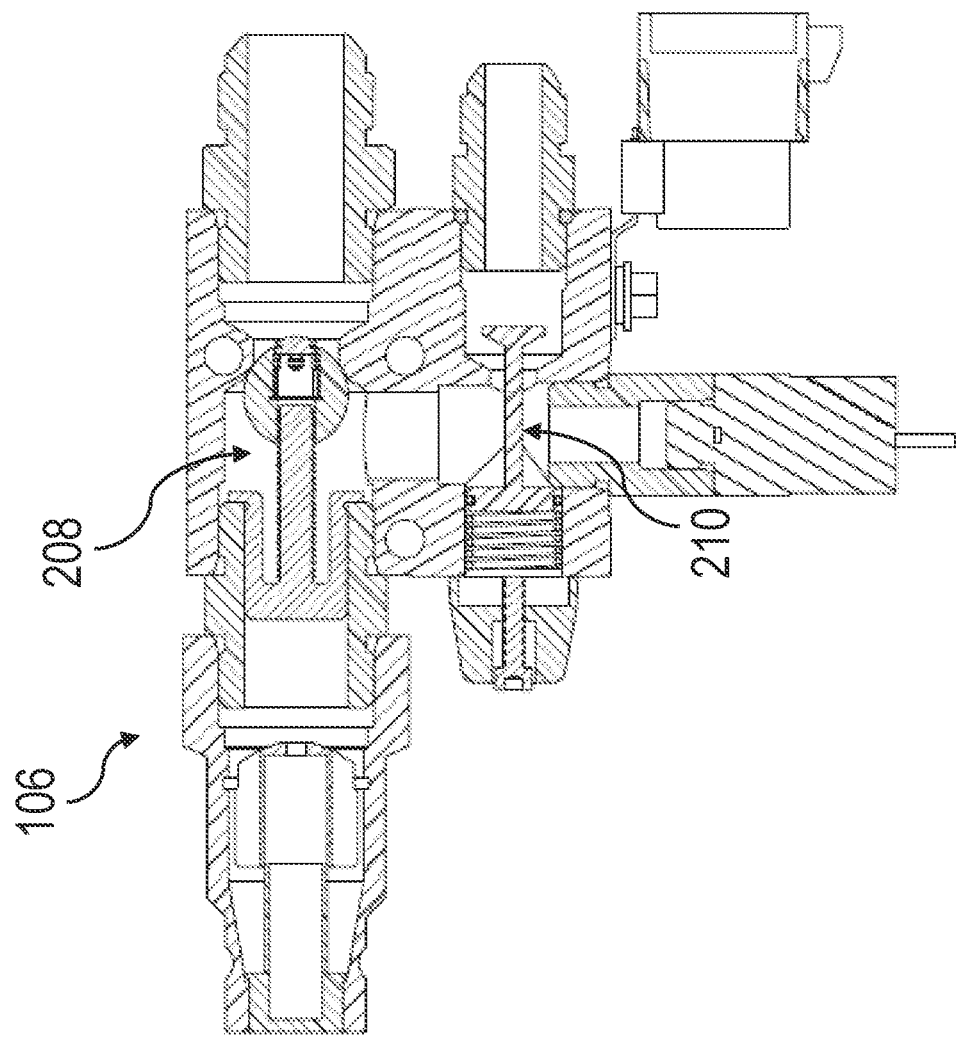
Figure 2B:
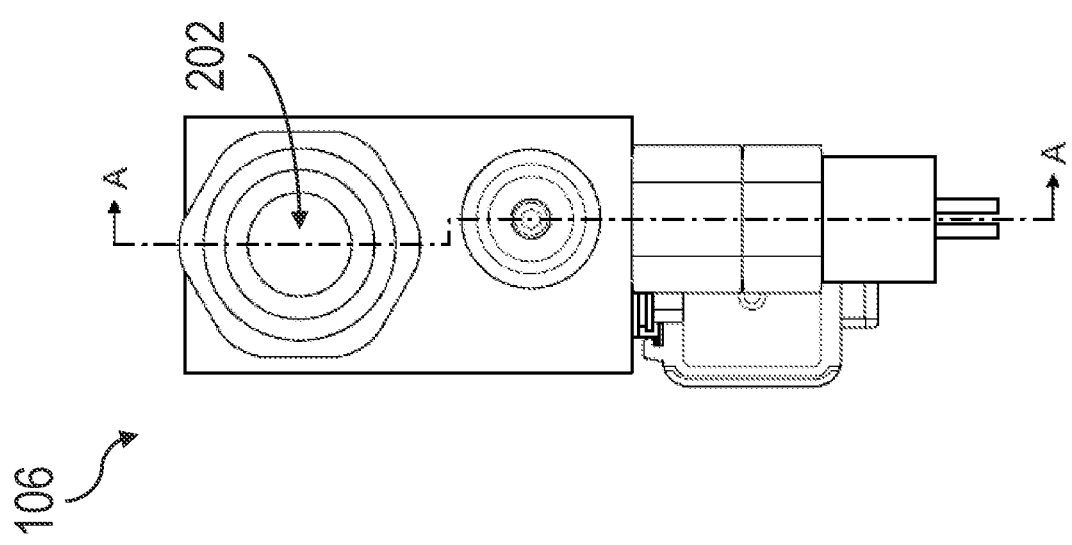

Referring now to FIGS. 2A-C, a perspective, side, and sectioned view of the valve assembly 106 of the system 100 of FIG. 1, are respectively depicted in accordance with at least one non-limiting aspect of the present disclosure. According to the non-limiting aspect, of FIGS. 2A-C, the valve assembly 106 can include a pressure relief system 208 and a pressure regulating system 210, as depicted in the sectioned view of FIG. 2C. The sectioned view of FIG. 2C is taken about line C-C, as depicted in the side view of FIG. 2B. The pressure relief system 208 will be discussed in further detail with reference to FIGS. 3-5 and the pressure regulating system 210 will be discussed in further detail with reference to FIGS. 6-8.

It shall be appreciated that, although the valve assembly 106 of FIG. 2 includes both a pressure relief system 208 and a pressure regulating system 210, the present disclosure contemplates other non-limiting aspects, wherein the valve assembly 106 can include either a pressure relief system 208 or a pressure regulating system 210. For example, according to the non-limiting aspect of FIGS. 3-5 another valve assembly 306 can only include the pressure relief system 208 of FIG. 2. Likewise, according to the non-limiting aspects of FIGS. 6-8, another valve assembly 606 can only include the pressure regulating system 210 of FIG. 2. Regardless, it shall be appreciated that the present disclosure contemplates some non-limiting aspects wherein either the pressure relief system 208 or a pressure regulating system 210 and some non-limiting aspects wherein both the pressure relief system 208 and the pressure regulating system 210 are employed to manage and control pressure in the valve assembly 106.

According to the non-limiting aspect of FIG. 2, the valve assembly 106 can include an inlet/outlet port 202 connectable to one or more components of the fluid system 100 of FIG. 1. It shall be appreciated that a fluid (e.g., oil, cleaning agent, air, etc.) can enter the valve assembly 106 from the fluid system 100 (FIG. 1) via the inlet/outlet port 202 during a fluid service provided by the fluid system 100 (FIG. 1). The valve assembly 106 can further include a machine reservoir port 204 configured to establish fluidic communication between the fluid system 100 (FIG. 1) and a portion of the machine 102 (FIG. 1), such as a crankcase or sump of an engine via the valve assembly 106. The valve assembly 106 can further include a filter port 206 configured to establish fluidic communication between the fluid system 100 (FIG. 1) and a filter of the machine 102 (FIG. 1) via the valve assembly 106. Each of the ports 202, 204, 206 of the valve assembly 106 can include via fluidic interfaces configured for user-friendly connections, including interfaces for a quick disconnect connector, a cam-lock, a barbed connector, a friction fit connector, and/or a clamped connector, amongst others.

As depicted in FIG. 2, the valve assembly 106 can include an actuating mechanism 212 including a support, a spring, and a ball, similar to the actuating mechanisms described in U.S. Pat. No. 9,523,296, titled VALVE ASSEMBLY FOR MACHINE FLUID OPERATIONS, which issued on Dec. 20, 2016, the disclosure of which is hereby incorporated by reference in its entirety herein. The ball of the actuating mechanism 212, for example, can be made from a polypropylene, or another suitable material capable of establishing a fluidic seal upon contact with a surface. Specifically, the actuating mechanism 212 can be structured to react to pressure changes within the valve assembly 106. In response to such pressure changes, the mechanism 212 may alternate between a normally closed position and an open position in which the ball moves toward the direction of the inlet/outlet port 202 to establish a fluid communication path between the fluid system 100 (FIG. 1) and the machine reservoir port 204.

For example, during a fluid evacuation operation, negative pressure can be applied at the inlet/outlet port 202 of the valve assembly 106 of FIG. 2, such as by the pump 108 (FIG. 1) or the fluid component 108 upon connection to the valve assembly 106. In response to the negative pressure, the spring of the actuating mechanism 212 can be compressed, causing the the ball of the actuating mechanism 212 to move from the machine reservoir port 204 and towards the inlet/outlet port 202, ultimately arriving at the open position. In the open position, the actuating mechanism 212 establishes a fluidic communication between the inlet/outlet port 202—and thus, the fluid system 100 of FIG. 1—and the machine reservoir port 204. Thus, a fluid can flow through the valve assembly 106 through the machine reservoir port 204 and out of the inlet/outlet port 202. Thus, during the fluid evacuation operation performed by the system 100 of FIG. 1, used or dirty oil can be removed from a reservoir (e.g., a sump) of the machine 102 (FIG. 2) by evacuating the used oil from the reservoir through the machine reservoir port 204 and inlet outlet port 202 of the valve assembly 106, via the pump 104 and/or fluid component 108. According to some non-limiting aspects, fluid flow through the valve assembly 106 from the filter port 206 may be inhibited via a check valve associated with the filter port 206 that closes in response to the negative pressure provided by the pump 104 (FIG. 1).

Alternately, during a fluid refill operation, positive pressure can be applied at the inlet/outlet port 102, such as by the pump 108 (FIG. 1) or the fluid component 108 upon connection to the valve assembly 106. In response to the positive pressure, the spring of the actuating mechanism 212 can be extended, such that the ball moves in a direction away from the inlet/outlet port 202 toward the machine reservoir port 204, establishing a substantial fluidic seal that prevents fluid from flowing into the reservoir of the machine 102 (FIG. 1) via the machine reservoir port 204. Instead, fluid communication is established between the inlet/outlet port 202 and the filter port 206 to facilitate the flow of a fluid through one or more machine filters coupled to the filter port 206. Thus, during a fluid refill operation, a clean or new fluid can be pumped into a filter of the machine 102 (FIG. 1) via the pump 104 (FIG. 1) and/or fluid component 108 (FIG. 1) from the inlet/outlet port 202 through the filter port 206.

Referring now to FIG. 3, a side view of another valve assembly 300, including the pressure relief system 218 of FIG. 2, a side view of another valve assembly 300 is depicted in accordance with at least one non-limiting aspect of the present disclosure. According to the non-limiting aspect of FIG. 3, a side of the valve assembly 300 including the inlet/outlet port 202 is depicted. As such, the machine reservoir port 204 is not visible in the side view of FIG. 3. However, the side view of FIG. 3 does depict line A-A, bout which the sectioned view of FIG. 4 is taken.

Figure 4:
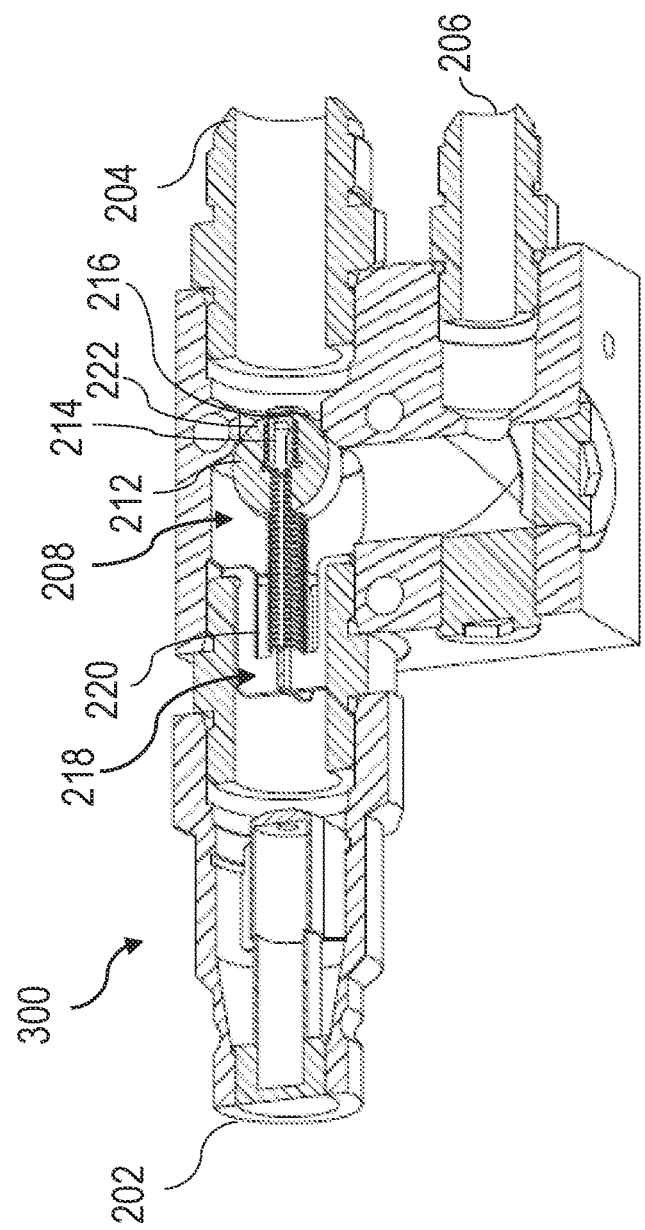
FIG. 4 illustrates a sectioned view of the valve assembly of FIG. 3 taken about cross-section line A-A, wherein the pressure relief system is in a closed position.

Referring now to FIG. 4, a sectioned view of the valve assembly 300 taken about line A-A, as depicted in the side view of FIG. 3, wherein the pressure relief system 208 is in a closed position. According to the non-limiting aspect of FIG. 4, the pressure relief system 208 of the valve assembly 300 can include a housing 212, within which a poppet 214 is seated and configured to transition between a closed position—wherein the poppet 214 is within the housing 212—and an open position—wherein the poppet 214 is protruding from the housing 212. According to FIG. 4, the poppet 214 is in the closed position. The poppet 214, for example, can include an aperture 216 defined in it, wherein the aperture 216 can establish fluidic communication between an interior cavity defined by the valve assembly 300 and the machine reservoir port 204. Additionally, a first spring 222 can be placed within the housing and positioned about the poppet 214. The first spring 222 can include a first spring constant configured to bias the poppet 214 in the closed position, as depicted in FIG. 4.

Figure 5:
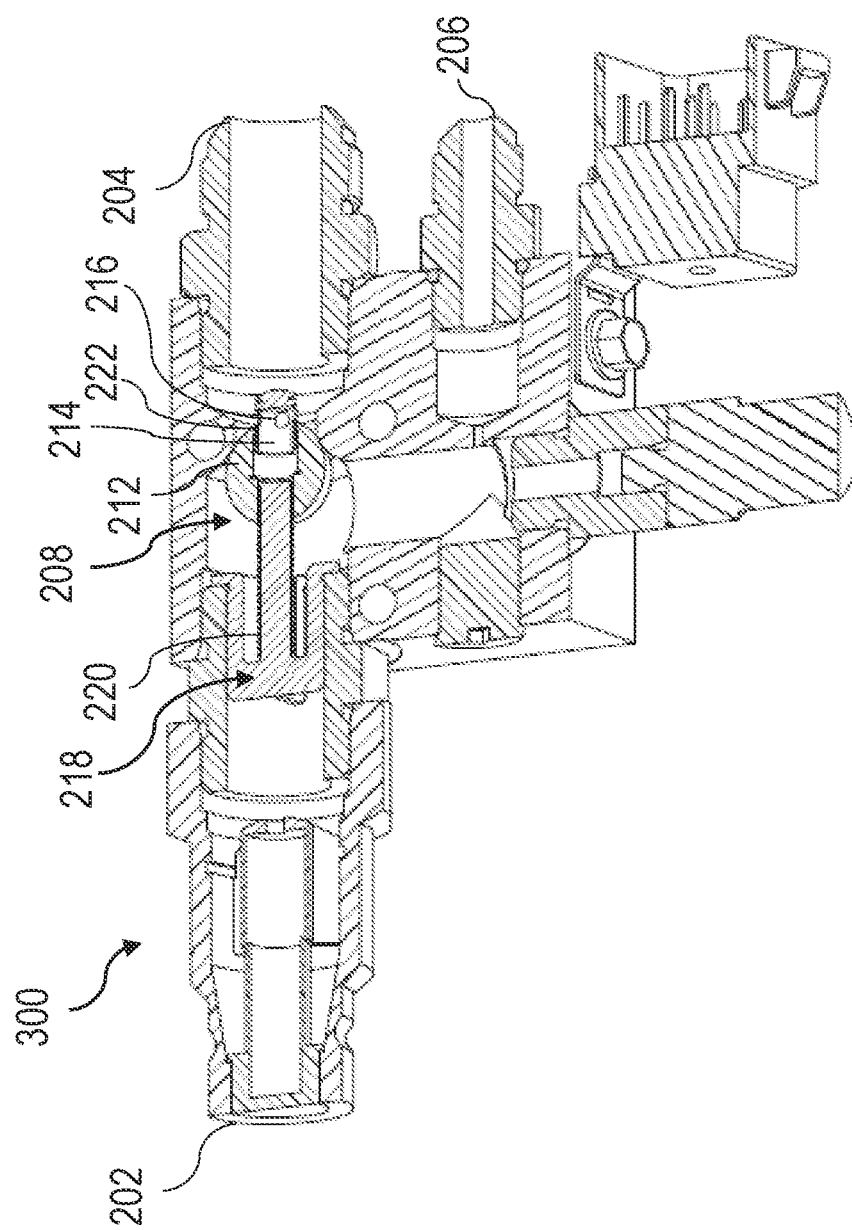
FIG. 5 illustrates a perspective, sectioned view of the valve assembly of FIG. 3 taken about cross-section line A-A, wherein the pressure relief system is in an open position.

According to the non-limiting aspect of FIG. 4, the valve assembly 300 can further include an actuating mechanism, similar to those described in U.S. Pat. No. 9,523,296, titled VALVE ASSEMBLY FOR MACHINE FLUID OPERATIONS, which issued on Dec. 20, 2016, the disclosure of which is hereby incorporated by reference in its entirety herein. For example, the housing 212 can be spherically configured and capable of being seated within a seat of a valve coupled an internal cavity of the valve assembly 300 with the machine reservoir port 204. The housing 212, for example, can comprise a polymer, such as polypropylene and/or another suitable material. The actuating mechanism can further include a strut assembly 218 fixed within the internal cavity defined by the valve assembly 300, about which a second spring 220 can be positioned. The second spring 220 can include a second spring constant configured to bias the housing 212 in a closed position, as depicted in FIG. 4. Specifically, FIG. 4 depicts the housing 212 as seated and therefore, in the closed position. However, the actuating mechanism can be configured to react to pressure changes within the valve assembly 300. In response to such pressure changes (e.g., during an evacuation process, amongst others) the housing 212 can transition from the closed position, as shown in FIG. 5, to an open position in which the housing 212 moves toward the direction of the inlet/outlet port 202, thereby establishing fluidic communication from the machine fluid reservoir port 204 to the inlet/outlet port 202. According to some non-limiting aspects, such a pressure can occur upon the mechanical connection of one or more types of couplings, such as a quick-disconnect device, to one or more of the various ports 202, 204, 206.

Referring now to FIG. 5, a perspective, sectioned view of the valve assembly 300 of FIG. 3 is depicted, wherein the pressure relief system 208 is in an open position. According to the non-limiting aspect of FIG. 5, when a pressure in the machine reservoir port 204 of the valve assembly 300 exceeds a force resulting from the bias of the first spring constant and/or a force resulting from the bias of the second spring constant can be overcome, thereby causing the poppet 214 to transition from the closed position, as depicted in FIG. 4, to an open position, as depicted in FIG. 5. In the open position, the poppet 214—and more specifically, the aperture 216—protrudes from the housing 212. The aperture 216, therefore, establishes a fluidic communication between an internal cavity defined by the valve assembly 300 and the machine reservoir port 204, enabling fluid to leave the internal cavity defined by the valve assembly 300 and into a machine reservoir (e.g., a crank case of an engine) via the machine reservoir port 204. It shall be appreciated that, a pressure causing the poppet 214 to transition from the closed position to the open position can be caused by a restriction either within or upstream of the valve assembly 300, resulting in excessive pressure in or around the machine reservoir port 204 and/or excessive pressure provided via the inlet/outlet port 202 of the valve assembly 300.

In other words, as the aperture 216 protrudes from the housing 212, it relieves excessive pressure that builds within the valve assembly 300 by enabling fluidic access to the machine reservoir port 204 and providing egress that supplements the filter port 206. As such, the pressure relief system 208 of the valve assembly 300 can prevent excess pressure and/or fluid from damaging the machine, thereby enabling the benefits associated with use of the valve assembly 300 while protecting the machine from excessive pressures in the machine reservoir (e.g., engine crank case).

Figure 6:
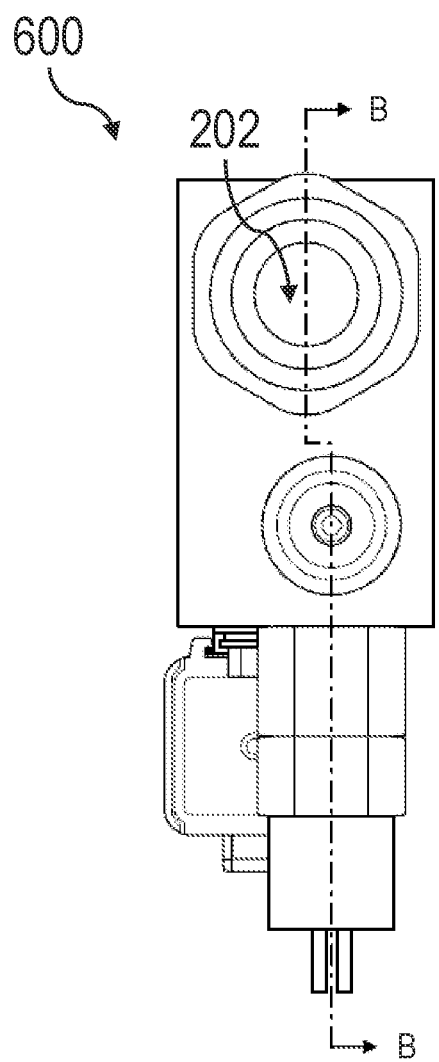
FIG. 6 illustrates a side view of another valve assembly, including a pressure regulating system, in accordance with at least one non-limiting aspect of the present disclosure.

Referring now to FIG. 6, a side view of another valve assembly 600, including the pressure regulating system 210 of FIG. 2, in accordance with at least one non-limiting aspect of the present disclosure. According to the non-limiting aspect of FIG. 6, a side of the valve assembly 600 including the inlet/outlet port 202 is depicted. As such, the machine reservoir port 204 is not visible in the side view of FIG. 6. However, the side view of FIG. 6 does depict line B-B, about which the sectioned view of FIG. 7 is taken.

Figure 7:
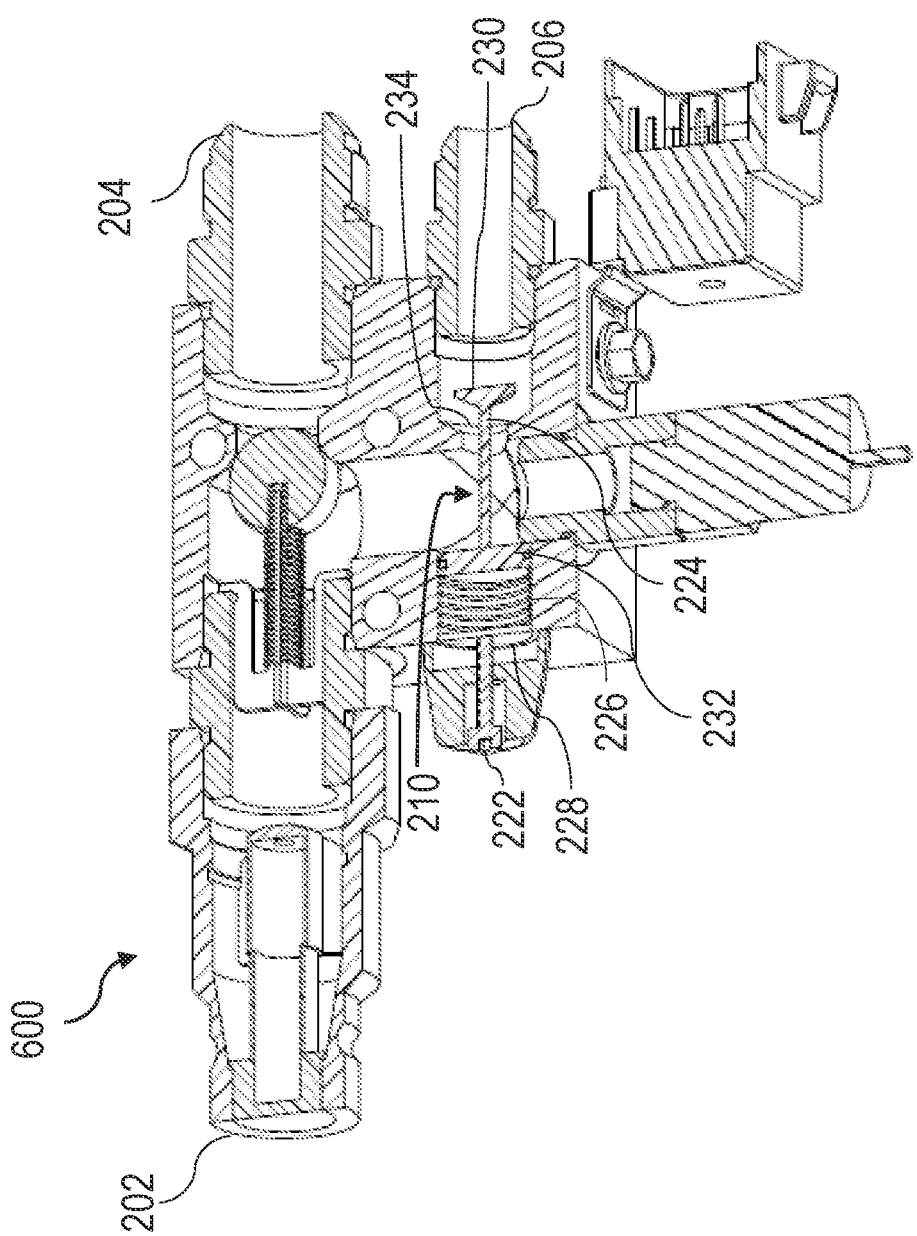
FIG. 7 illustrates a sectioned view of the valve assembly of FIG. 6 taken about cross-section line B-B, wherein the pressure regulating system is in an open position.

Referring now to FIG. 7, a sectioned view of the valve assembly 600 of FIG. 6 taken about cross-section line B-B, wherein the pressure regulating system 210 is in an open position. According to the non-limiting aspect of FIG. 7, the pressure regulating system 210 can include a plunger head 230 mechanically coupled to a first base 228 that is fixed to plunger base 232 via a shaft 224. The plunger base 232 can be mechanically coupled to a third spring 226 comprising a third spring constant. Although the plunger head 230 is configured to be seated in a plunger head seat 234, the third spring constant is configured to bias the plunger head 230 in an open position, as depicted in FIG. 7. Nonetheless, the plunger head 230 is configured to transition between the open position of FIG. 7 and a closed position, as depicted in FIG. 8, in response to pressure changes within the internal cavity defined by the valve assembly 600.

For example, according to the non-limiting aspect of FIG. 7, pressure may build within the machine 102 during a fluid operation (e.g., a fill procedure, a purge procedure, etc.). This pressure may traverse the filter port 206 of the valve assembly 600 and begin interacting with the plunger head 230. If the pressure exceeds a force resulting from the bias of the third spring constant, the plunger head 230 will begin to transition from the open position, as depicted in FIG. 7, to a closed position, as depicted in FIG. 8. In the open position, the plunger head 230 remains unseated and thus, fluid can flow between the plunger head seat 234 and the plunger head 230, through the filter port 206 and into a filter of the machine 102 (FIG. 1). However, as pressure builds and the force resulting from the bias of the third spring constant us overcome, open space between the plunger head seat 234 and the plunger head 230 begins the decrease, thereby restricting flow and regulating a quantity of fluid that can enter the filter port 206, which helps manage and control pressure in the machine 102 (FIG. 1). When the bias provided by the spring constant of the third spring 226 is fully overcome, the plunger head 230 will be transitioned to the closed position, in which the plunger head 230 is completely seated in the plunger head seat 234, establishing a fluidic seal that prevents a flow of fluid from traversing into the filter port 206. The closed position of the pressure regulating system 210 is depicted in FIG. 8.

Still referring to FIG. 7, the third spring 226 can be mechanically coupled to a spring base 228, which can be mechanically coupled to a set screw 222. It shall be appreciated that turning the set screw 222 can cause the spring base 228 to traverse closer to and/or further away from the plunger base 232, depending on its direction of rotation of the set screw 222. As the spring base 228 traverses closer to the plunger base 232 in response to set screw 222 rotations, the spring constant of the third spring 226 will increase. The higher the spring constant of the third spring 226, the more pressure required to overcome the bias provided by the third spring 225, which means the pressure regulating system 210 will be less sensitive to pressures within the machine 102, as provided via the filter port 206. Conversely, the lower the spring constant of the third spring 226, the less pressure required to overcome the bias provided by the third spring 225, which means the pressure regulating system 210 will be more sensitive to pressures within the machine 102, as provided via the filter port 206. Accordingly, the valve assembly 600—and specifically, sensitivity of the pressure regulating system 210—can be customized in accordance with a user's specific preferences and/or requirements.

Figure 8:
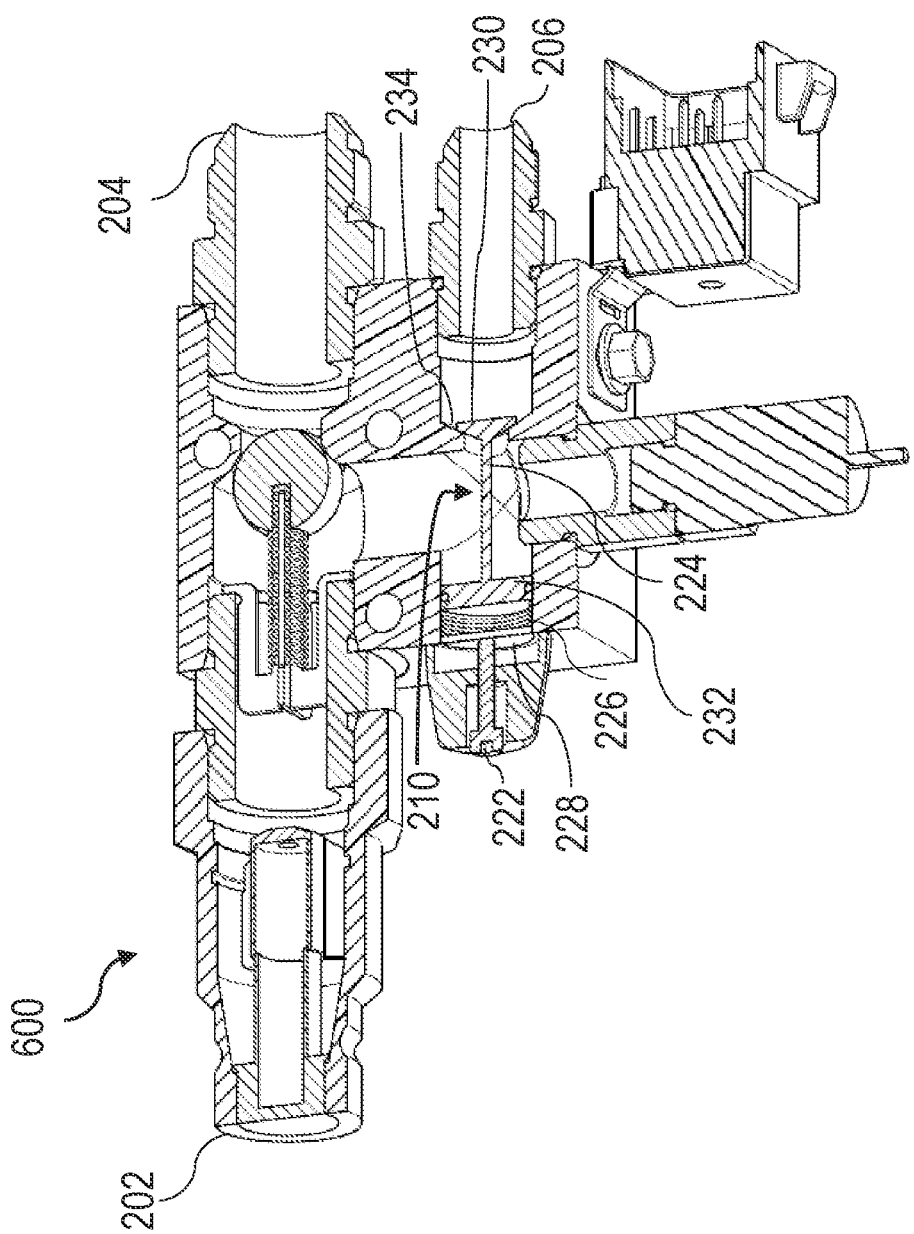
FIG. 8 illustrates a perspective, sectioned view of the valve assembly of FIG. 6 taken about cross-section line B-B, wherein the pressure regulating system is in a closed position.

Referring now to FIG. 8, a perspective, sectioned view of the valve assembly of FIG. 6 taken about cross-section line B-B, wherein the pressure regulating system 210 is in a closed position. As previously discussed, pressure within the machine 102 (FIG. 1) has exceeded a threshold defined by a force resulting from the bias of the third spring constant and therefore, has been overcome. In response, pressure has caused the plunger head 230 to arrive at its closed position, wherein the plunger head 230 is properly seated within and sealed against the plunger head seat 234. Accordingly, there is no more open space between the plunger head seat 234 through which fluid can flow through the filter port 206, which helps manage and control pressure in the machine 102 (FIG. 1). As fluid within the machine 102 (FIG. 1) is dispositioned into the machine reservoir (e.g., a sump) or outside of the machine 102 (FIG. 1), the pressure begins to subside, which allows the biasing force provided via the third spring 226 to once again transition the plunger head 230 from the closed position of FIG. 8 to the open position of FIG. 7.

In other words, as the pressure regulating system 210 of FIGS. 6-8 regulates pressure that builds within the machine 102 (FIG. 1) by restricting fluidic access to the filter port 206 in proportional response to pressure generated within the machine 102 (FIG. 1). As such, the pressure regulating system 210 of the valve assembly 600 enables the benefits associated with use of the valve assembly 600 while protecting the machine from excessive pressures in the machine reservoir (e.g., engine crank case).

As previously discussed, the present disclosure contemplates a non-limiting aspect wherein the pressure relief system 208 of FIGS. 3-5 and the pressure regulating system 210 of FIGS. 6-8 are used in tandem (e.g., valve assembly 106 of FIG. 2). According to such non-limiting aspects, the pressure regulating system 210 can dynamically regulate pressure and will eventually open back up as pressure in the machine 102 (FIG. 1) is reduced. However, as long as the pressure regulating system 210 is in the closed position, pressure within the internal cavity defined by the valve assembly 106 (FIG. 2) can be relieved via the pressure relief system 208 (FIGS. 3-5). In other words, as pressure within the machine 102 (FIG. 1) causes the pressure regulating system 210 to transition from an open position to a closed position, pressure within the internal cavity defined by the valve assembly 106 (FIG. 2) may increase. This is particularly true if fluid is still being supplied via the inlet/output port 202. Accordingly, a bias provided by the first spring constant may be overcome, transitioning the poppet 214 from the closed position (FIG. 4) to the open position (FIG. 5), thereby relieving pressure withing the internal cavity defined by the valve assembly 106 (FIG. 2). However, as pressure within the machine 102 (FIG. 1) is regulated by the pressure regulating system 210 and thus, begins to subside, bias provided by the first spring constant will cause the poppet 214 to transition from the open position (FIG. 5) to the closed position (FIG. 4). With the pressure relief system 208 closed and the pressure regulating system 210 open, a fluid process (e.g., a fill procedure, a purge procedure, etc.) can resume normal operation.

Furthermore, the present disclosure contemplates embodiments wherein the aforementioned springs are produced from a piezoelectric material, such that the biasing forces can be electrically customized. Accordingly, the same valve assembly, including the pressure relief and regulating systems disclosed herein, can be implemented for a variety of machines 102 (FIG. 1), each of which might have a different pressure sensitivity. This customization can be automated and thus, can eliminate the need for additional setup time and expense. Accordingly, it shall be appreciated that the valve assemblies disclosed herein can be communicably coupled (e.g., wired and/or wirelessly) to a control circuit and therefore, remotely and/or autonomously operated.

Figure 9:
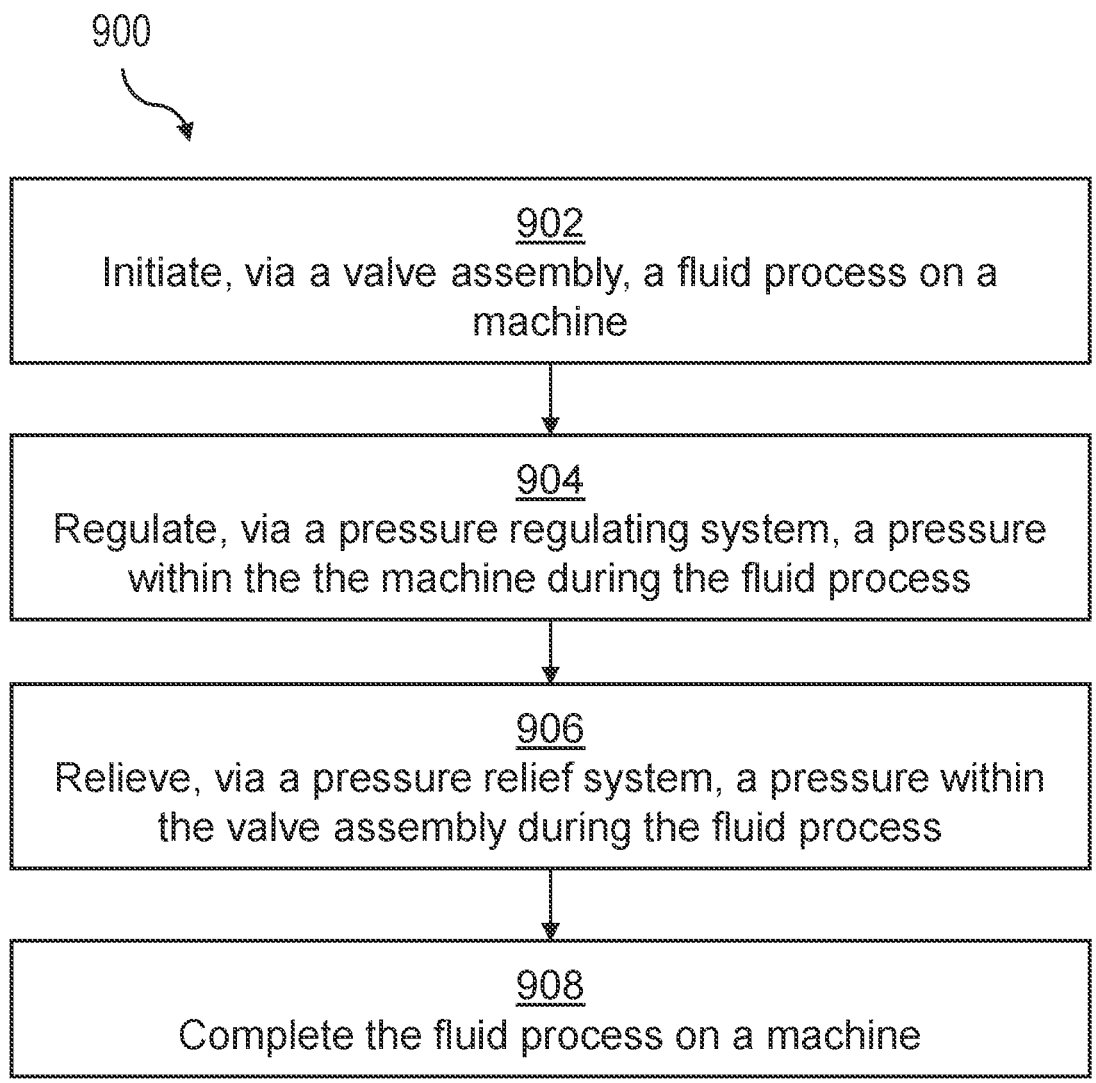
FIG. 9 illustrates a method of relieving pressure within a valve assembly is depicted in accordance with at least one non-limiting aspect of the present disclosure.

Referring now to FIG. 9, a method 900 of managing pressure within a valve assembly is depicted in accordance with at least one non-limiting aspect of the present disclosure. It shall be appreciated that the method 900 of FIG. 9 can be performed via any of the valve assemblies, pressure relief systems, and/or pressure regulating systems disclosed herein. Furthermore, it shall be appreciated that, according to some non-limiting aspects, any of the steps of the method 900 of FIG. 9 can be implemented independent of the other steps. Moreover, according to other non-limiting aspects, the steps of the method 900 of FIG. 9 can be supplemented with other steps based on the functionality described in reference to the valve assemblies, the pressure relief systems, and/or the pressure regulating systems disclosed herein. According to some non-limiting aspects, one or more steps of the method 900 of FIG. 9 can be autonomously implemented via a control circuit communicably coupled to the valve assemblies, pressure relief systems, and/or pressure regulating systems disclosed herein.

According to the non-limiting aspect of FIG. 9, the method 900 can include initiating 902, via a valve assembly, a fluid process on a machine. For example, the fluid process can include a fill, purge, and/or evacuation process wherein fluid (e.g., air, oil, purging agent, etc.) is either introduced or removed to a filter and/or reservoir of a machine 102 (FIG. 1). The method 900 can further include regulating 904, via a pressure regulating system, a pressure within the machine during the fluid process. The regulating 904 can include generating a pressure in the machine sufficient to overcome a biasing force of a spring of the pressure regulating system, thereby transitioning the pressure regulating system from an open position to a closed position.

In further reference to FIG. 9, the method 900 can further include relieving 906, via a pressure relief system, a pressure within the valve assembly during the fluid process. The regulating 904 can include generating a pressure within the valve assembly sufficient to overcome a biasing force of a spring of the pressure relief system, thereby transitioning the pressure relief system from a closed position to an open position. The method 900 can further include completing 908 the fluid process on a machine.

Various aspects of the subject matter described herein are set out in the following numbered clauses:

Clause 1: A valve assembly configured to perform a fluid service on a machine, the valve assembly including an inlet/outlet port fluidically coupling a fluid component to an internal cavity defined by the valve assembly, a filter port fluidically coupling the internal cavity to a filter of the machine, and a pressure regulating system including a plunger head configured to transition between an open position and a closed position, a plunger head seat, wherein the plunger head and the plunger head seat are collectively configured to define an aperture between the internal cavity and the filter port in the open position, and wherein the plunger head and the plunger head seat are collectively configured to establish a fluidic seal between the internal cavity and the filter port in the closed position, and a spring including a spring constant configured to bias the plunger head in the open position, wherein the spring constant is configured to be overcome in response to a predetermined pressure within the machine.

Clause 2. The valve assembly according to clause 2, wherein the plunger head is mechanically coupled to a plunger base, and wherein the spring is mounted to a spring base and positioned between the spring base and the plunger base.

Clause 3. The valve assembly according to either of clauses 1 or 2, further including a set screw, wherein the set screw is configured to rotate, wherein rotating the set screw is configured to alter the spring constant of the spring, and wherein the altered spring constant is configured to be overcome in response to a second predetermined pressure within the machine.

Clause 4. The valve assembly according to any of clauses 1-3, wherein the altered spring constant is greater than the spring constant, and wherein the second predetermined pressure is higher than the predetermined pressure.

Clause 5. The valve assembly according to any of clauses 1-4, wherein the altered spring constant is less than the spring constant, and wherein the second predetermined pressure is lower than the predetermined pressure.

Clause 6. The valve assembly according to any of clauses 1-5, wherein rotating the set screw is configured to alter a distance between the plunger base and the spring base.

Clause 7. The valve assembly according to any of clauses 1-6, wherein the plunger head is mechanically coupled to the plunger base via a shaft.

Clause 8. The valve assembly according to any of clauses 1-7, further including a pressure relief system including a housing; a poppet defining an aperture, wherein the poppet is configured to transition between a closed position wherein the aperture is contained within the housing and incapable of conveying fluid from the internal cavity to the machine reservoir port, and an open position wherein the aperture protrudes beyond the housing and capable of conveying fluid from the internal cavity to the machine reservoir port, and a spring including a spring constant configured to bias the poppet in the closed position, wherein the spring constant is configured to be overcome in response to a predetermined pressure within the valve assembly.

Clause 9. The valve assembly according to any of clauses 1-8, further including an actuating mechanism configured to transition from a closed position to an open position in response to a third predetermined pressure in the internal cavity caused by a second fluid service performed on the machine.

Clause 10. The valve assembly according to any of clauses 1-9, wherein the housing is a component of the actuating mechanism and configured to transition from the closed position of the actuating mechanism to the open position of the actuating mechanism in response to the third predetermined pressure caused by the second fluid service performed on the machine.

Clause 11. The valve assembly according to any of clauses 1-10, wherein the housing includes a spherical configuration.

Clause 12. The valve assembly according to any of clauses 1-11, wherein the spring includes a piezoelectric material, and wherein electrical stimulation of the piezoelectric material can alter the spring constant.

Clause 13 A valve assembly configured to perform a fluid service on a machine, the valve assembly including an inlet/outlet port fluidically coupling a fluid component to an internal cavity defined by the valve assembly, a machine reservoir port fluidically coupling the internal cavity to a machine reservoir of the machine, and a pressure relief system including a housing, a poppet defining an aperture, wherein the poppet is configured to transition between a closed position wherein the aperture is contained within the housing and incapable of conveying fluid from the internal cavity to the machine reservoir port, and an open position wherein the aperture protrudes beyond the housing and capable of conveying fluid from the internal cavity to the machine reservoir port, and a spring including a spring constant configured to bias the poppet in the closed position, wherein the spring constant is configured to be overcome in response to a predetermined pressure within the valve assembly.

Clause 14. The valve assembly according to clause 13, further including an actuating mechanism configured to transition from a closed position to an open position in response to a third predetermined pressure in the internal cavity caused by a second fluid service performed on the machine.

Clause 15. The valve assembly according to either of clauses 13 or 14, wherein the housing is a component of the actuating mechanism and configured to transition from the closed position of the actuating mechanism to the open position of the actuating mechanism in response to the third predetermined pressure caused by the second fluid service performed on the machine.

Clause 16. The valve assembly according to any of clauses 13-15, wherein the housing includes a spherical configuration.

Clause 17. The valve assembly according to any of clauses 13-16, wherein the spring includes a piezoelectric material, and wherein electrical stimulation of the piezoelectric material can alter the spring constant.

Clause 18. A method of managing pressure within a valve assembly, the method including initiating, via the valve assembly, a fluid process on a machine, regulating, via a pressure regulating system, a first pressure within the machine during the fluid process, relieving, via a pressure relief system, a second pressure within the valve assembly during the fluid process, and completing the fluid process on a machine.

Clause 19. The method according to clause 18, wherein regulating the first pressure within the machine includes overcoming a first biasing force of a first spring of the pressure regulating system, thereby transitioning the pressure regulating system from an open position to a closed position.

Clause 20. The method according to either of clauses 18 or 19, wherein relieving the second pressure within the valve assembly includes overcoming a second biasing force of a second spring of the pressure relief system, thereby transitioning the pressure relief system from a closed position to an open position.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements but is not limited to possessing only those one or more elements. Likewise, an element of a system, device, or apparatus that "comprises," "has," "includes" or "contains" one or more features possesses those one or more features but is not limited to possessing only those one or more features.

Instructions used to program logic to perform various disclosed aspects can be stored within a memory in the system, such as dynamic random-access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random-access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microcontroller configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instructions sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively, or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively, or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

What is claimed is:

1. A valve assembly configured to perform a fluid service on a machine, the valve assembly comprising:
    an inlet/outlet port fluidically coupling a fluid component to an internal cavity defined by the valve assembly;
    a filter port configured to fluidically couple the internal cavity to a filter of the machine; and
    a pressure regulating system comprising:
        a plunger head configured to transition between an open position and a closed position;
        a plunger head seat, wherein the plunger head and the plunger head seat are collectively configured to define an aperture between the internal cavity and the filter port in the open position, and wherein the plunger head and the plunger head seat are collectively configured to establish a fluidic seal between the internal cavity and the filter port in the closed position; and
        a spring comprising a spring constant configured to bias the plunger head in the open position, wherein the spring constant is configured to be overcome in response to a predetermined pressure within the machine, thereby transitioning the plunger head from the open position to the closed position, wherein the plunger head is mechanically coupled to a plunger base, and wherein the spring is mounted to a spring base and positioned between the spring base and the plunger base; and
        a set screw, wherein the set screw is configured to rotate, wherein rotating the set screw is configured to alter the spring constant of the spring, wherein the altered spring constant is configured to be overcome in response to a second predetermined pressure within the machine, wherein the altered spring constant is less than the spring constant, and wherein the second predetermined pressure is lower than the predetermined pressure.

2. The valve assembly of claim 1, wherein the altered spring constant is greater than the spring constant, and wherein the second predetermined pressure is higher than the predetermined pressure.

3. The valve assembly of claim 1, wherein rotating the set screw is configured to alter a distance between the plunger base and the spring base.

4. The valve assembly of claim 1, wherein the plunger head is mechanically coupled to the plunger base via a shaft.

5. The valve assembly of claim 1, further comprising a pressure relief system comprising:
    a housing;
    a poppet defining an aperture, wherein the poppet is configured to transition between a closed position wherein the aperture is contained within the housing and incapable of conveying fluid from the internal cavity to a machine reservoir port, and an open position wherein the aperture protrudes beyond the housing and capable of conveying fluid from the internal cavity to the machine reservoir port; and
    a spring comprising a spring constant configured to bias the poppet in the closed position, wherein the spring constant is configured to be overcome in response to a predetermined pressure within the valve assembly.

6. The valve assembly of claim 5, further comprising an actuating mechanism configured to transition from a closed position to an open position in response to a third predetermined pressure in the internal cavity caused by a second fluid service performed on the machine.

7. The valve assembly of claim 6, wherein the housing is a component of the actuating mechanism and configured to transition from the closed position of the actuating mechanism to the open position of the actuating mechanism in response to the third predetermined pressure caused by the second fluid service performed on the machine.

8. The valve assembly of claim 7, wherein the housing comprises a spherical configuration.

9. The valve assembly of claim 1, wherein the spring comprises a piezoelectric material, and wherein electrical stimulation of the piezoelectric material can alter the spring constant.

10. A valve assembly configured to perform a fluid service on a machine, the valve assembly comprising:
    an inlet/outlet port fluidically coupling a fluid component to an internal cavity defined by the valve assembly;
    a machine reservoir port fluidically coupling the internal cavity to a machine reservoir of the machine; and
    a pressure relief system comprising:

a housing;
a poppet defining an aperture, wherein the poppet is configured to transition between a closed position wherein the aperture is contained within the housing and incapable of conveying fluid from the internal cavity to the machine reservoir port, and an open position wherein the aperture protrudes beyond the housing and capable of conveying fluid from the internal cavity to the machine reservoir port;
a spring comprising a spring constant configured to bias the poppet in the closed position, wherein the spring constant is configured to be overcome in response to a predetermined pressure within the valve assembly; and
an actuating mechanism configured to transition from a closed position to an open position in response to a third predetermined pressure in the internal cavity caused by a second fluid service performed on the machine.

11. The valve assembly of claim 10, wherein the housing is a component of the actuating mechanism and configured to transition from the closed position of the actuating mechanism to the open position of the actuating mechanism in response to the third predetermined pressure caused by the second fluid service performed on the machine.

12. The valve assembly of claim 11, wherein the housing comprises a spherical configuration.

13. The valve assembly of claim 10, wherein the spring comprises a piezoelectric material, and wherein electrical stimulation of the piezoelectric material can alter the spring constant.

14. A valve assembly configured to perform a fluid service on a machine, the valve assembly comprising:
an inlet/outlet port fluidically coupling a fluid component to an internal cavity defined by the valve assembly;
a filter port configured to fluidically couple the internal cavity to a filter of the machine; and
a pressure regulating system comprising:
a plunger head configured to transition between an open position and a closed position;
a plunger head seat, wherein the plunger head and the plunger head seat are collectively configured to define an aperture between the internal cavity and the filter port in the open position, and wherein the plunger head and the plunger head seat are collectively configured to establish a fluidic seal between the internal cavity and the filter port in the closed position; and
a spring comprising a spring constant configured to bias the plunger head in the open position, wherein the spring constant is configured to be overcome in response to a predetermined pressure within the machine, thereby transitioning the plunger head from the open position to the closed position, wherein the plunger head is mechanically coupled to a plunger base, and wherein the spring is mounted to a spring base and positioned between the spring base and the plunger base; and a set screw, wherein the set screw is configured to rotate, wherein rotating the set screw is configured to alter the spring constant of the spring, wherein rotating the set screw is configured to alter a distance between the plunger base and the spring base, and wherein the altered spring constant is configured to be overcome in response to a second predetermined pressure within the machine.

15. The valve assembly of claim 14, wherein the plunger head is mechanically coupled to the plunger base via a shaft.

16. The valve assembly of claim 14, further comprising an actuating mechanism configured to transition from a closed position to an open position in response to a third predetermined pressure in the internal cavity caused by a second fluid service performed on the machine.

17. The valve assembly of claim 14, wherein the spring comprises a piezoelectric material, and wherein electrical stimulation of the piezoelectric material can alter the spring constant.

18. A valve assembly configured to perform a fluid service on a machine, the valve assembly comprising:
an inlet/outlet port fluidically coupling a fluid component to an internal cavity defined by the valve assembly;
a filter port configured to fluidically couple the internal cavity to a filter of the machine; and
a pressure regulating system comprising:
a plunger head configured to transition between an open position and a closed position;
a plunger head seat, wherein the plunger head and the plunger head seat are collectively configured to define an aperture between the internal cavity and the filter port in the open position, and wherein the plunger head and the plunger head seat are collectively configured to establish a fluidic seal between the internal cavity and the filter port in the closed position; and
a spring comprising a spring constant configured to bias the plunger head in the open position, wherein the spring constant is configured to be overcome in response to a predetermined pressure within the machine, thereby transitioning the plunger head from the open position to the closed position, wherein the plunger head is mechanically coupled to a plunger base, wherein the spring is mounted to a spring base and positioned between the spring base and the plunger base, and wherein the plunger head is mechanically coupled to the plunger base via a shaft; and
a set screw, wherein the set screw is configured to rotate, wherein rotating the set screw is configured to alter the spring constant of the spring, and wherein the altered spring constant is configured to be overcome in response to a second predetermined pressure within the machine.

\* \* \* \* \*